United States Patent
Chen et al.

(10) Patent No.: US 8,195,894 B2
(45) Date of Patent: Jun. 5, 2012

(54) DATA PROCESSING APPARATUS OF BASIC INPUT/OUTPUT SYSTEM

(75) Inventors: Chung-Hui Chen, Taipei (TW); Jia-Shiung Guo, Taipei (TW)

(73) Assignee: Inventec Corporation, Taipei (TW)

( * ) Notice: Subject to any disclaimer, the term of this patent is extended or adjusted under 35 U.S.C. 154(b) by 505 days.

(21) Appl. No.: 12/538,333

(22) Filed: Aug. 10, 2009

(65) Prior Publication Data

US 2010/0281225 A1 Nov. 4, 2010

(30) Foreign Application Priority Data

Apr. 30, 2009 (TW) .............................. 98114408 A

(51) Int. Cl.
*G06F 9/00* (2006.01)
*G06F 12/02* (2006.01)

(52) U.S. Cl. ................. 711/147; 711/E12.002; 713/2

(58) Field of Classification Search .................. None
See application file for complete search history.

(56) References Cited

U.S. PATENT DOCUMENTS

2010/0128387 A1* 5/2010 Sendelbach et al. ....... 360/97.02
* cited by examiner

*Primary Examiner* — Kevin Verbrugge
(74) *Attorney, Agent, or Firm* — J.C. Patents

(57) ABSTRACT

A data processing apparatus of a basic input/output system (BIOS) is provided. The data processing apparatus includes a BIOS unit, a share memory and a control unit. The BIOS unit writes command data into the share memory, wherein the command data includes identification data stored in an identification field. The control unit reads and performs the command data according to the identification data in the identification field. After the command data is performed, the control unit writes returned data into the share memory for the BIOS unit to read the returned data, wherein the returned data includes the execution result of the command data performed by the control unit and also includes the identification data.

13 Claims, 5 Drawing Sheets

DATA PROCESSING APPARATUS OF BASIC INPUT/OUTPUT SYSTEM

CROSS-REFERENCE TO RELATED APPLICATION

This application claims the priority benefit of Taiwan application serial no. 98114408, filed on Apr. 30, 2009. The entirety of the above-mentioned patent application is hereby incorporated by reference herein and made a part of this specification.

BACKGROUND OF THE INVENTION

1. Field of the Invention

The present invention is related to a data processing apparatus, and more particularly, to a data processing apparatus of a basic input/output system (BIOS).

2. Description of Related Art

When data is transferred between a conventional basic input/output system (BIOS) and an embedded controller (EC), whether the EC is in a busy status is required to be first determined through an input/output port (I/O port), and the conventional BIOS can then just communicate with the EC when the EC is not in the busy status. For example, the conventional BIOS can just communicate with the EC when the conventional BIOS issues a command to the EC or waits for the EC to reply a result of processing data. In addition, limited to a transmission method of Industry Standard Architecture (ISA), data can just be transferred in a word length of 8 bits. Since a processing speed of a central processing unit is normally much higher than a processing speed of the EC, a communication mechanism between the conventional BIOS and the EC may greatly lower operational efficiency and performance of an entire computer.

SUMMARY OF THE INVENTION

The present invention provides a data processing apparatus of a basic input/output system (BIOS) for enhancing performance of the entire BIOS and lowering probability of execution errors of a control unit.

The present invention proposes a data processing apparatus of a BIOS, which including a basic input/output system unit (BIOS unit), a shared memory and a control unit. The BIOS unit is configured to issue command data, wherein the command data includes identification data and a command name. The shared memory is coupled to the BIOS unit, wherein the BIOS unit writes the command data into the shared memory, and the identification data in the command data is stored in an identification field. The control unit is coupled to the shared memory for reading and performing the command data according to the identification data in the identification field, and writing returned data into the shared memory for the BIOS unit to read the returned data from the shared memory, wherein the returned data is the executed result of the command data performed by the control unit, and the returned data includes the identification data.

In an embodiment of the present invention, the control unit reads and performs the command data when the identification data represents a non-zero value.

In an embodiment of the present invention, the command data further includes to-be-processed data.

In an embodiment of the present invention, the returned data further includes processing status data and processed data, wherein the processing status data indicates the execution result of the command data performed by the control unit.

In an embodiment of the present invention, the shared memory includes a write memory block and a read memory block, wherein the BIOS unit stores the command data into the write memory block, and the control unit stores the returned data into the read memory block.

In an embodiment of the present invention, the control unit clears the command data in the write memory block after the control unit reads the command data.

In an embodiment of the present invention, the BIOS unit clears the returned data in the read memory block after the BIOS unit reads the returned data.

In an embodiment of the present invention, the control unit issues an interrupt signal to notify the BIOS unit to read the returned data.

In an embodiment of the present invention, the shared memory includes a read/write memory block, wherein the read/write memory block is used to store the command data and the returned data.

In an embodiment of the present invention, the command data further includes read/write status data and the to-be-processed data, wherein the read/write status data is stored in a read/write status field for indicating an access status of the read/write memory block.

In an embodiment of the present invention, the access status of the read/write memory block includes a read status, a write status and a busy status, wherein the access status of the read/write memory block is the read status after the BIOS unit writes the command data, the access status of the read/write memory block is the busy status after the control unit reads the command data, and the access status of the read/write memory block is the read status after the control unit reads the returned data.

In an embodiment of the present invention, the returned data further includes read/write status data, processing status data and processed data, wherein the processing status data indicates the execution result of the command data performed by the control unit.

In an embodiment of the present invention, the control unit is an embedded controller.

In view of the above, the present invention stores the command data and the returned data through the shared memory, such that the BIOS unit is not required to wait for the control unit to complete old commands before providing the control unit with new commands, thereby enhancing performance of the entire BIOS. In addition, high speed and continuous access and transfer of large block data can be achieved by using the shared memory as a communication medium of the BIOS unit and the control unit, and it is more efficient than a data transfer method of a conventional architecture.

In order to make the aforementioned and other features and advantages of the present invention more comprehensible, several embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
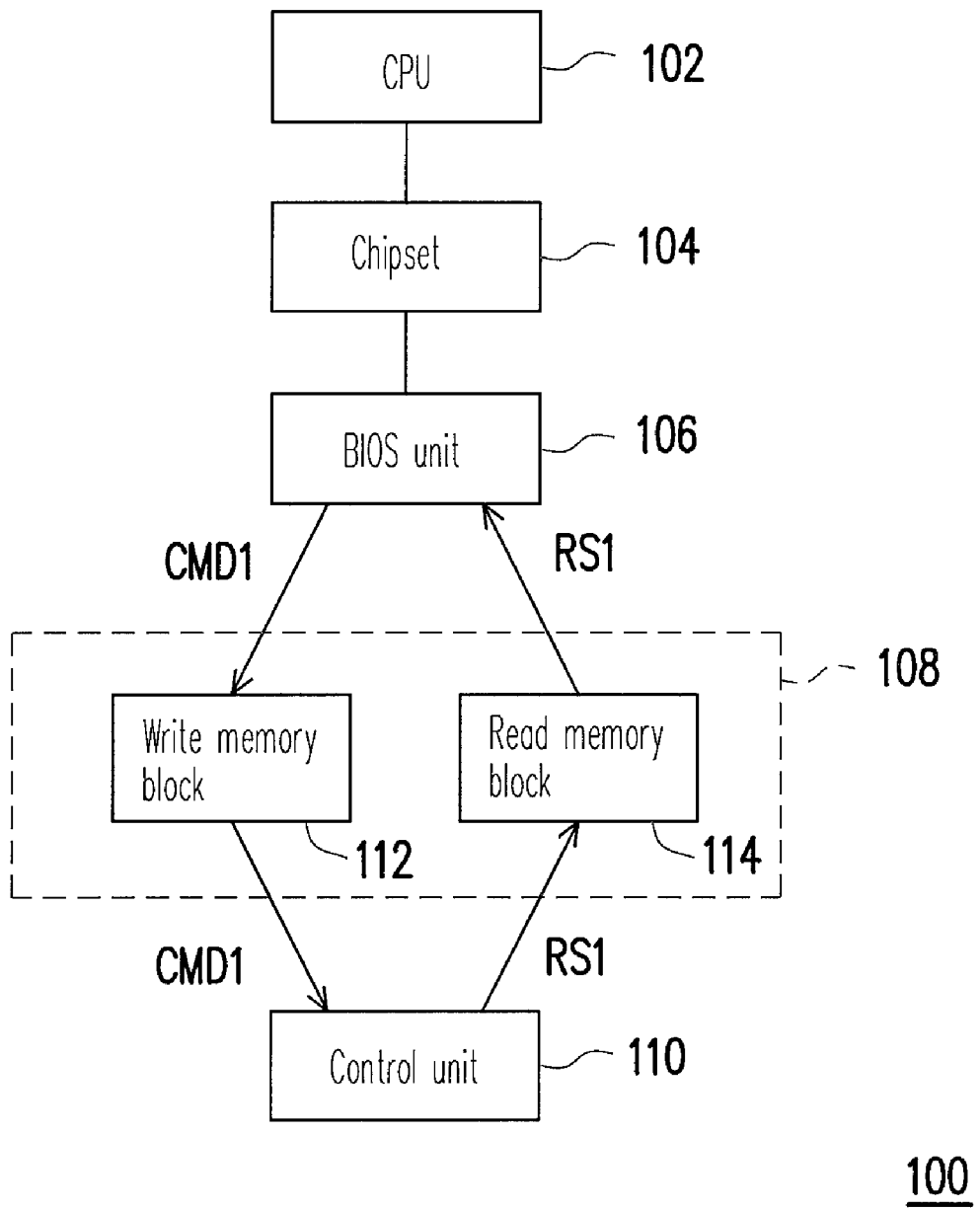
FIG. 1 is a block diagram illustrating data processing apparatus of a basic input/output system according to an embodiment of the present embodiment.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram illustrating data processing apparatus of a basic input/output system according to an embodiment of the present embodiment. Referring to FIG. 1, the data processing apparatus 100 includes a central processing unit (CPU) 102, a chipset 104, a basic input/output system (BIOS) unit 106, a shared memory 108 and a control unit 110. In a computer system, the CPU 102 may be coupled to the BIOS unit 106 through the chipset 104, and coupled to other hardware devices such as a hard disk, an optical disk device, a display device and so forth. The shared memory is coupled to the BIOS unit 106 and the control unit 110. The control unit 110 may be controlled by the CPU 102 and responsible for several peripheral devices and functionalities such as a connection port of a keyboard or a mouse.

Wherein, the shared memory 108 may be, for example, dynamic random access memory (DRAM), static dynamic random access memory (SDRAM) and double dynamic random access memory (DDRAM). The control unit 110 may be, for example, an embedded controller (EC). In addition, the BIOS unit 106 then may be implemented by flash memory.

When the BIOS unit 106 intends to issue command data CMD1 to the control unit 110, the BIOS unit 106 writes the command data CMD1 into the shared memory 108. Wherein, the command data CMD1 may include identification data, a command name and to-be-processed data, and the identification data is stored in the identification field. The control unit 110 reads and performs the command data CMD1 according to the identification data in the identification field. After the control unit 110 completes the command provided by the BIOS unit 106, the control unit 110 stores returned data RS1 back into the shared memory 108. Wherein, the returned data RS1 includes the identification data read from the identification field, processed data and processing status data. Wherein, the processing status data indicates the executed result of the command data CMD1 performed by the control unit 110. The BIOS unit 106 may read back the returned data RS1 from the shared memory 108 so as to confirm and receive the executed result of the command data CMD1 performed by the control unit 110.

To be more specific, the shared memory 108 may include a write memory block 112 and a read memory block 114. The read memory block 112 is responsible for storing the command data CMD1, and the read memory block 114 is responsible for the returned data RS1. In addition, the identification data in the identification field may have different values so as to represent different command data CMD1 and returned data RS1, and for the BIOS unit 106 and the control unit 110 to identify a corresponding relationship between the command data CMD1 and the returned data RS1. Accordingly, the BIOS unit 106 and the control unit 110 are enabled to perform an asynchronous communication. It is to be noted that, when a value of the identification data is 0, it means that the command data CMD1 or the returned data RS1 have been processed completely.

Before the BIOS unit 106 stores the command data CMD1 into the write memory block 112, the BIOS unit 106 first reads completely the returned data RS1 which have not been read in the read memory block 114, and clears the returned data RS1 which have been read in the read memory block 114 (i.e., the identification data of the identification field in the returned data RS1 is modified to be 0). Next, the BIOS unit 106 checks whether there is still the command data CMD1 which have not been processed in the write memory block 112 (i.e., checking whether the identification data of the identification field in the command data CMD1 is a non-zero value). If yes, the control unit 110 waits to complete processing of the command data CMD1 which have not been processed; if no, then the BIOS unit 106 stores the command data CMD1 into the write memory block 112. Wherein, the stored command data CMD1 has a corresponding non-zero identification data value such as 1.

It is to be noted that, the write memory block 112 and the read memory block 114 are taken as examples in the present embodiment to describe a basic architecture of the data processing apparatus of the BIOS in detail. In the present embodiment, since there are just two memory blocks (the write memory block 112 and the read memory block 114) illustrated herein, the BIOS unit 106 is required to wait for the control unit 110 to complete processing of the command data CMD1 before the BIOS unit 106 issues a new command data. However, the present invention is not limited thereto. When there are a sufficient number of memory blocks in the shared memory 108, the BIOS may directly issue a new command data without waiting for the control unit 110 to complete the processing of the command data CMD1, and an implementation method will be described in detail in corresponding embodiments thereinafter.

When the control unit 110 polls the command data CMD1 (i.e., the identification data of the identification field in the command data CMD1 is a non-zero value) which have not been performed in the memory block 112, the control unit 110 reads the command data CMD1 which have not been performed and performs a designated command by the BIOS unit 106 according to the command name in the command data CMD1. After the control unit 110 completes the designated command, the control unit 110 stores the executed result (including the processed data and the processing status data) of the command data CMD1 and the identification data (whose value is identical to the identification data of the command data CMD1 performed by the control unit 110) into the shared memory block 114. Besides, the control unit 110 clears the data command CMD1 (i.e., the identification value of the identification field in the command data CMD1 is modified to be 0) which have been read in the write memory block 112.

As mentioned previously, data transfer between the BIOS unit 106 and the control unit 110 of the present embodiment may be implemented by using the shared memory 108 as a temporary storage area for storing the command data CMD1 and the returned data RS1, and by using a stored data format (i.e., the identification field) to determine statuses of the command data CMD1 and the returned data RS1. Thus, the BIOS unit 106 can complete transferring of commands without directly transmitting the command data CMD1 to the control unit 110.

In addition, an operating clock of the shared memory 108 generally is, for example, 667/800 MHz, an operating clock of the CPU 102 may reach more than 1 GHz, and an operating clock of the embedded controller is approximately 20 MHz. Therefore, a speed of directly writing the command data CMD1 into the shared memory 108 by the BIOS unit 106 is faster than directly writing the command data CMD1 into the control unit 110. Besides, a speed of reading the returned data RS1 from the shared memory 108 is also faster than directly accessing the command data CMD1 from the control unit 110. In other words, a data transfer speed between the BIOS unit 106 and the shared memory 108 is faster than a data transfer speed between the BIOS unit 106 and the control unit 110. Therefore, data transfer efficiency between the BIOS unit 106 and the control unit 110 may be greatly enhanced by using the shared memory 108 as a data buffer area for storing the command data CMD1 and the returned data RS1, and meanwhile transferring larger amount of data. The BIOS unit 106 is also not required to spend extra time to wait for the control unit 110 to complete the command.

Figure 2:
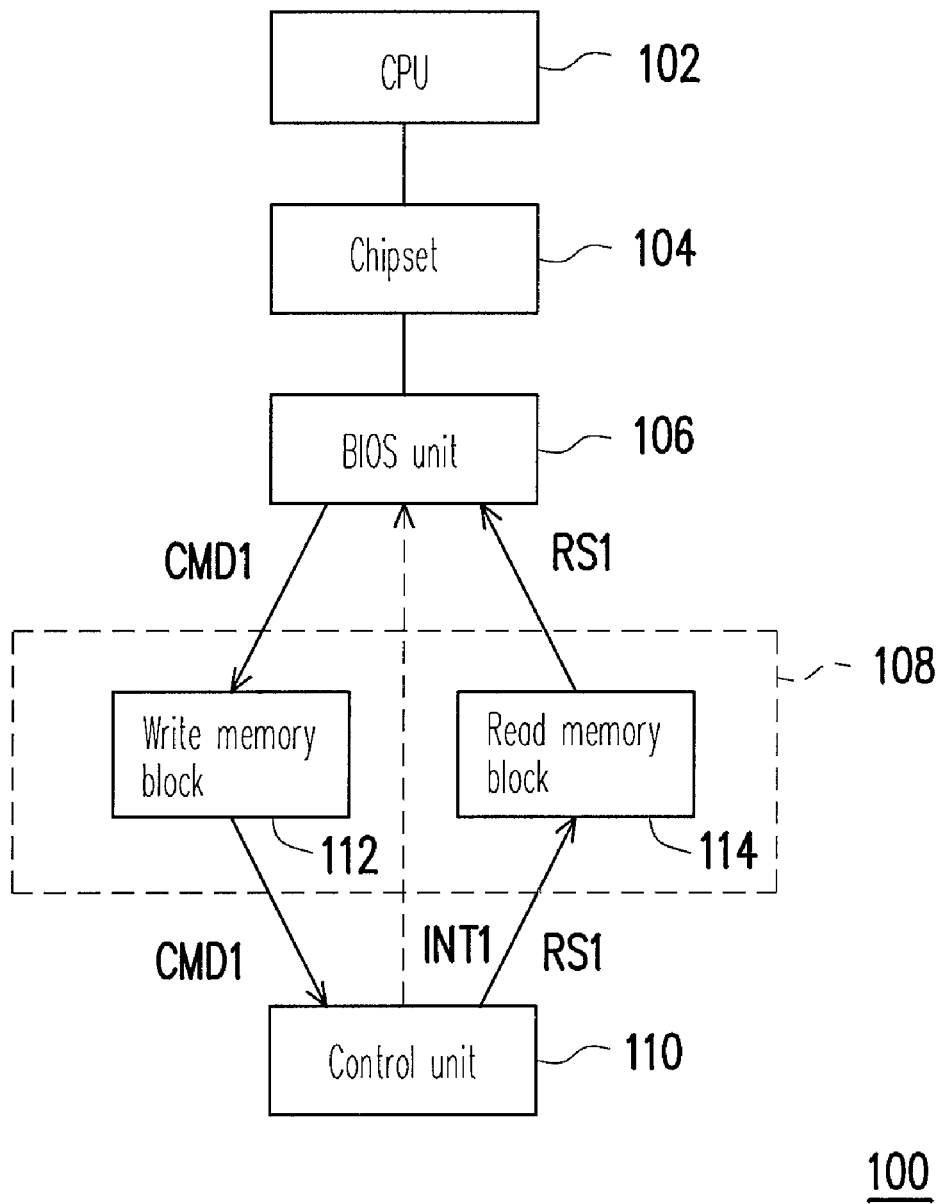
FIG. 2 is a block diagram illustrating data processing apparatus of a basic input/output system according to another embodiment of the present embodiment.

FIG. 2 is a block diagram illustrating data processing apparatus of a basic input/output system according to an embodiment of the present embodiment. Referring to FIG. 2, in the present embodiment, after the control unit 110 stores the returned data RS1 (including the executed result of the command data CMD1 and the identification data), the control unit 110 may directly issue an interrupt signal INT1 to the BIOS unit 106 so as to notify the BIOS unit 106 to read the returned data RS1. Wherein, the interrupt signal INT1 may be a System Management Interrupt (SMI) signal or a System Control Interrupt (SCI) signal. The interrupt signal INT1 issued by the control unit 110 of the present embodiment makes the BIOS unit 106 to gain a control right so as to read the returned data RS1. However, in practical applications, the aforementioned means is not a necessary means, and the BIOS unit 106 may also periodically poll the read memory block 114 so as to read the returned data RS1.

Figure 3:
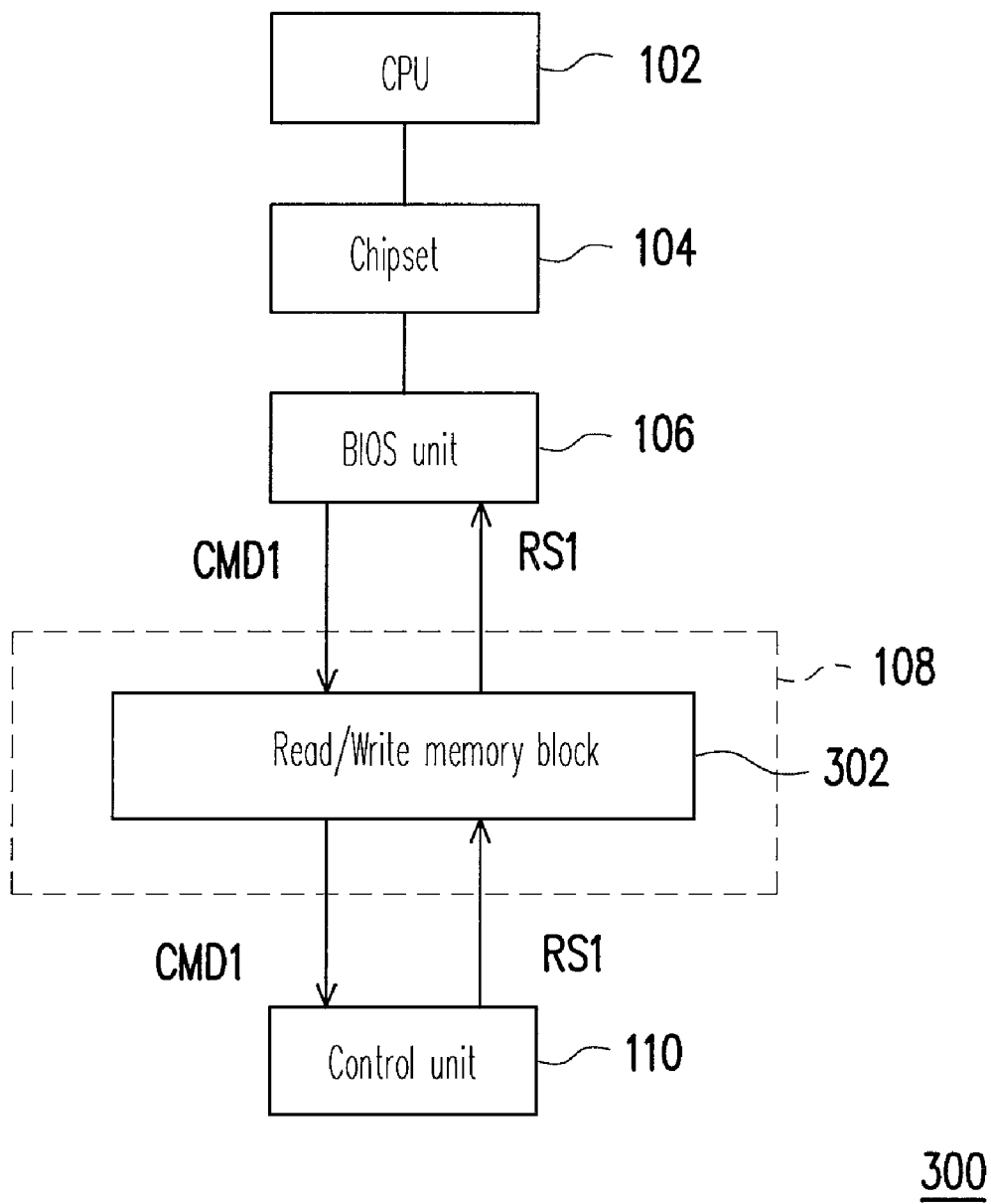
FIG. 3 is a block diagram illustrating data processing apparatus of a basic input/output system according to another embodiment of the present embodiment.

FIG. 3 is a block diagram illustrating data processing apparatus of a basic input/output system according to another embodiment of the present embodiment. Referring to FIG. 3, a difference between the data processing apparatus 300 and the data processing apparatus 100 lies in that, in the shared memory 108, the write memory block 112 and the read memory block 114 are combined to be the read/write memory block 302 of the present embodiment. The read/write memory block 302 has functionalities of the write memory block 112 and the read memory block 114. Besides, the read/write memory block 302 is capable of storing the command data CMD1 and the returned data RS1. In the present embodiment, the command data CMD1 and the returned data RS1 both further include read/write status data. The read/write status is stored in a read/write status field and indicates an access status of the read/write memory block 302 by using different values of the read/write status data.

For example, after the BIOS unit 106 writes the command data CMD1 into the read/write memory block 302, the access status of the read/write memory block 302 is a write status, and a functionality of the read/write memory block 302 meanwhile is equivalent to the write memory block 112 and capable of configuring the read/write status to be 0 for representing this status. After the control unit 110 reads the command data CMD1, the access status of the read/write memory block 302 is a busy status, such that writing new data by the BIOS unit 106 is avoided while the control unit 110 performs the command data CMD1. Meanwhile, the read/write status may be configured to be 1 for representing this status. After the BIOS unit 110 performs the command data CMD1 and writes the returned data RS1 into the read/write memory block 302, the access status of the read/write memory block 302 is a read status, and a functionality of the read/write memory block 302 meanwhile is equivalent to the read memory block 114 and is capable of configuring the read/write status to be 2 for representing this status. It is to be noted that although the read/write statuses 0, 1 and 2 are used to respectively represent the write status, the busy status and the read status in the present embodiment but the present invention is not limited thereto.

An operation method of the data processing apparatus 300 of the present embodiment is similar to the data processing apparatus 100. The operation method of the data processing apparatus 300 is described as following: before the BIOS unit 106 stores the command data CMD1 into the read/write memory block 302, the BIOS unit 106 first reads completely the returned data RS1 which have not been read in the read/write memory block 302, and clears the returned data RS1 which have been read in the read/write memory block 302 (i.e., the identification data of the identification field in the returned data RS1 is modified to be 0). Next, the BIOS unit 106 stores the command data CMD1 into the read/write memory block 302, and the access status of the read/write memory block 302 is the write status. Wherein, the stored command data CMD1 has a corresponding non-zero identification data value such as 1.

It is to be noted that, a single read/write memory block 302 is taken as an example in the present embodiment to describe a basic architecture of the data processing apparatus of the BIOS in detail. Thus, the BIOS unit 106 can just issue new command data after the BIOS unit 106 waits for the control unit 110 to complete the processing of the command data CMD1 and reads the returned data RS1, but the present invention is not limited thereto. When there is sufficient amount of the memory blocks in the shared memory, the BIOS unit 106 can directly issue new command data, and an implementation method will be described in detail in corresponding embodiments thereinafter.

When the control unit 110 polls the command data CMD1 which have not been performed in the read/write memory block 302 (i.e., the identification data of the identification field in the command data CMD1 is a non-zero value, and the read/write status data is 0), the control unit 110 reads the command data CMD1 which have not been performed and performs designated commands by the BIOS unit 106 according to the command name in the command data CMD1. Meanwhile, the access status of the read/write memory block 302 is the busy status (i.e., the identification data of the identification field in the command data CMD1 is a non-zero value and the read/write status data is 1). After the control unit 110 completes the designated command, the executed result (including the processed data and the processing status data) of the command data CMD1, the identification data (whose value is identical to the identification data of the command data CMD1 performed by the control unit 110) and the read/write status data (whose value is 2) are stored into the read/write memory block 302. Meanwhile, the access status of the read/write memory block 302 is the read status.

In addition, after the control unit 110 stores the returned data RS1 into the read/write memory block 302, the control unit 110 can read the returned data RS1 without waiting for the BIOS unit 106 to poll the access status of the read/write memory block 302. The control unit 110 may directly issue the interrupt signal INT1 to the BIOS unit 106 for notifying the BIOS unit 106 to read the returned data RS1, but the present invention is not limited thereto.

Figure 4:
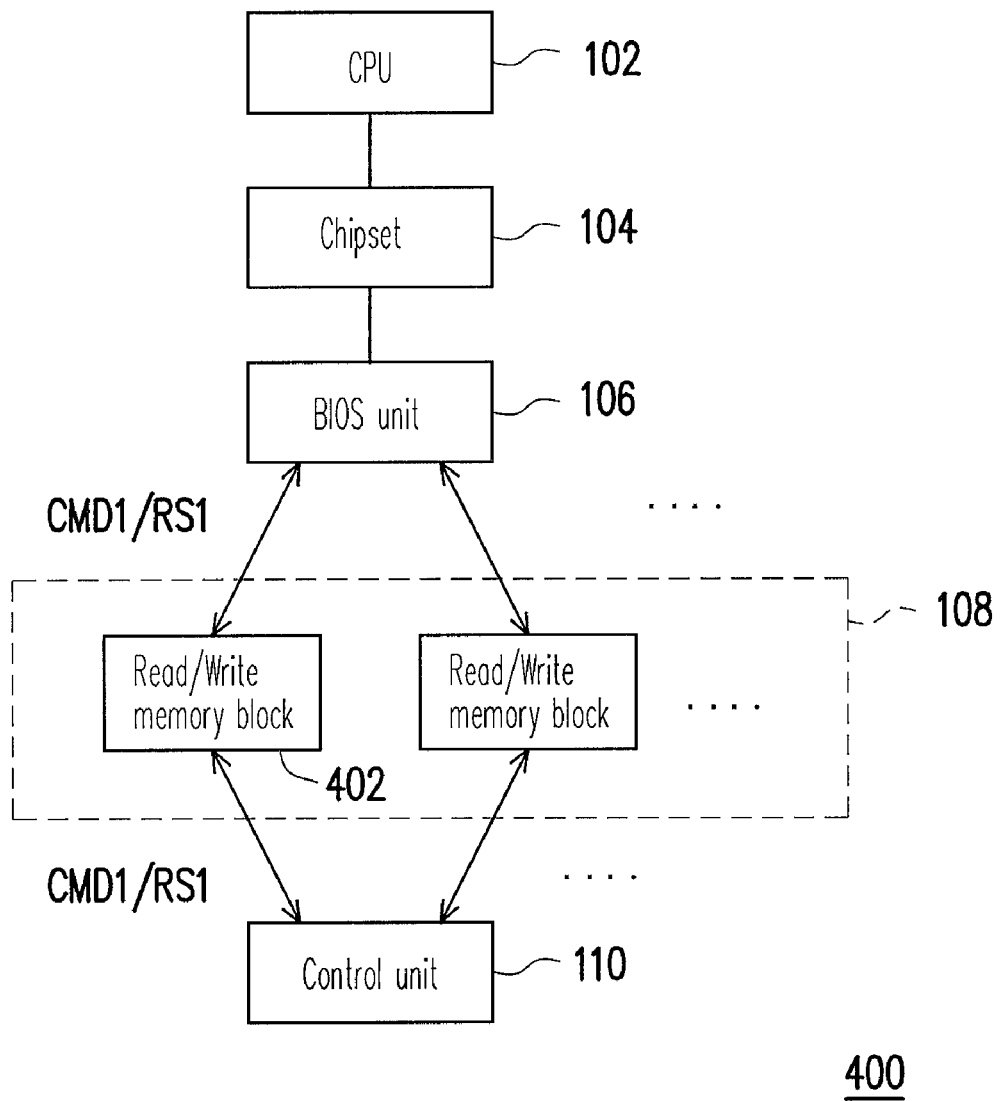
FIG. 4 is a block diagram illustrating data processing apparatus of a basic input/output system according to another embodiment of the present embodiment.

FIG. 4 is a block diagram illustrating data processing apparatus of a basic input/output system according to another embodiment of the present embodiment. Referring to FIG. 4, a difference between the data processing apparatus 400 and the data processing apparatus 300 lies in that the shared memory 108 of the present embodiment includes a plurality of read/write memory blocks 402.

When the BIOS unit 106 stores the command data CMD1 into the shared memory 108, the BIOS unit 106 may search for an empty read/write memory block 402 (i.e., the returned data of the identification data being 0 in the identification field) so as to store the command data CMD1 into the empty read/write memory block 402. After the command data CMD1 is stored, the access status of the read/write memory block 402 is the write status (i.e., the value of the read/write status data is 0). When the control unit 110 polls the command data CMD1 which have not been performed in the read/write memory block 402 (i.e., the identification data of the identification field in the command data CMD1 is a non-zero value, and the read/write status data is 0), the control unit 110 reads the command data CMD1 which have not been performed and performs designated commands by the BIOS unit 106 according to the command name in the command data CMD1. Meanwhile, the access status of the read/write memory block 402 is the busy status (i.e., the value of the read/write status data is 1). After the control unit 110 completes the designated command, the control unit 110 stores the returned data RS1 into the read/write memory block 402 which are originally read, and the access status of the read/write memory block 402 meanwhile is the read status (i.e., the value of the read/write access status data is 2). The BIOS unit 106 reads the returned data RS1 and clears the returned data RS1 (i.e., the value of the identification data of the identification field in the returned data RS1 is modified to be 0) which have been read in the read/write memory block 402 according to the value of the identification data of the identification field in the returned data RS1, so as to obtain the executed result of the corresponding command data CMD1.

In the present embodiment, since the shared memory 108 has a plurality of read/write memory blocks 402, the BIOS unit 106 may search for the empty read/write memory block 402 and directly issue new command data without waiting for the control unit 110 to complete the processing of the command data CMD1, thereby enhancing performance of the entire BIOS.

In addition, after the control unit 110 stores the returned data into the read/write memory block 402, the control unit 110 may also directly issue the interrupt signal INT1 to the BIOS unit 106 for notifying the BIOS unit 106 to read the returned data RS1, but the present invention is not limited thereto.

Figure 5:
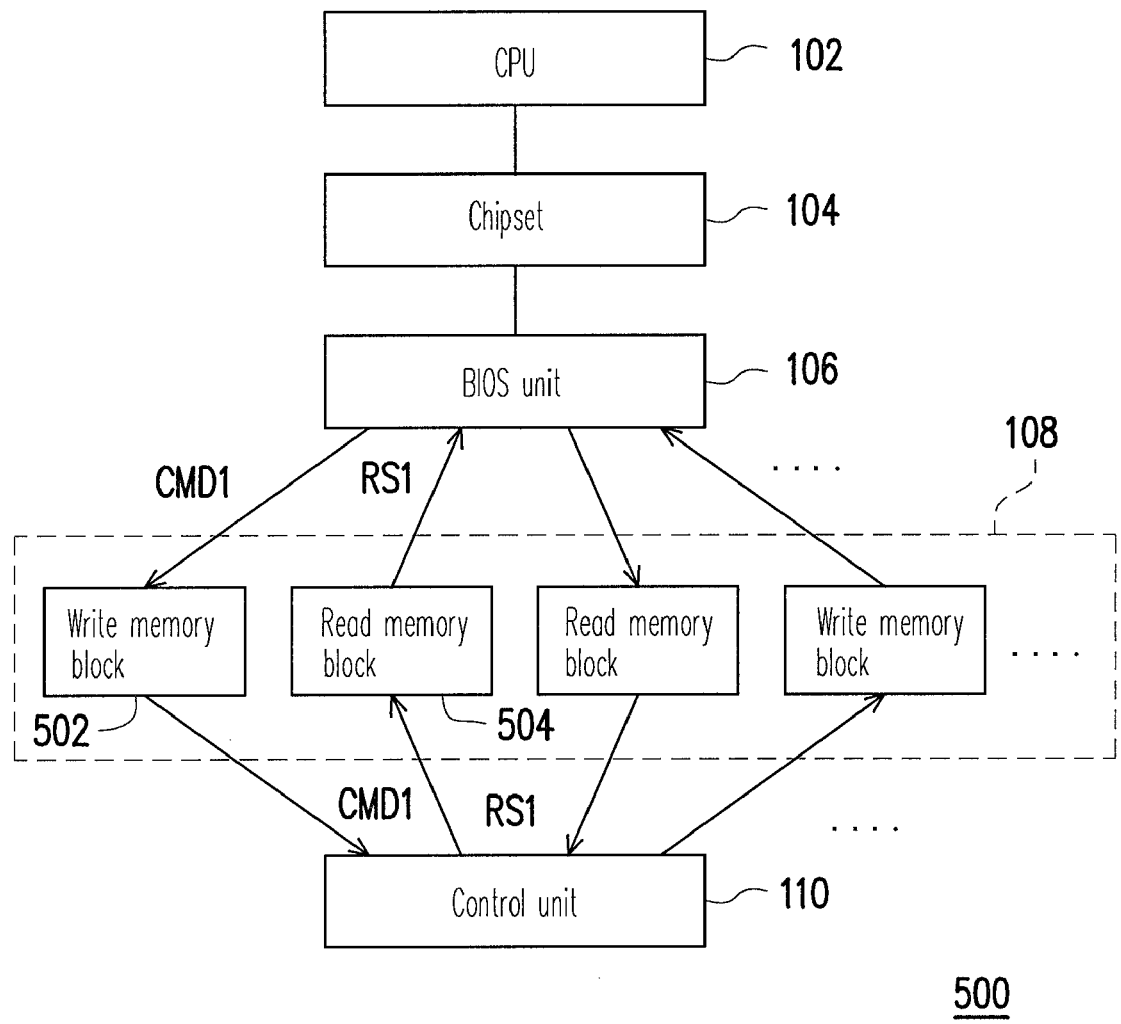
FIG. 5 is a block diagram illustrating data processing apparatus of a basic input/output system according to another embodiment of the present embodiment.

FIG. 5 is a block diagram illustrating data processing apparatus of a basic input/output system according to another embodiment of the present embodiment. Referring to FIG. 5, a difference between the data processing apparatus 500 and the data processing apparatus 100 lies in that the shared memory 108 of the present embodiment includes a plurality of write memory blocks 502 and a plurality of read memory blocks 504.

When the BIOS unit 106 stores the command data CMD1 into the shared memory 108, the BIOS unit 106 may search for an empty write memory block 502 (i.e., a value of the command data of the identification data being 0 in the identification field), so as to store the command data CMD1 into the empty write memory block 502 (i.e., a value of the command data of the identification data in the identification field is non-zero). When the control unit 110 polls the command data CMD1 (i.e., the identification data of the identification field in the command data CMD1 is a non-zero value) which have not been performed in the memory block 502, the control unit 110 reads the command data CMD1 which have not been performed and performs a designated command by the BIOS unit 106 according to a command name in the command data CMD1. After the control unit 110 completes the designated command, the control unit 110 stores the returned data RS1 into the read memory block 504 (i.e., the value of the identification data of the identification field in the returned data RS1 is meanwhile identical to the value of the identification data of the command data CMD1 read by the control unit 110) and clears the command data CMD1 (i.e., the value of the identification data of the identification field in the command data CMD1 is modified to be 0) which have been read in the write memory block 502. The BIOS unit 106 reads the returned data RS1 and clears the returned data RS1 (i.e., the value of the identification data of the identification field in the returned data RS1 is modified to be 0) which have been read in the read memory block 504 according to the value of the identification data of the identification field in the returned data RS1, so as to obtain the executed result of the corresponding command data CMD1.

In the present embodiment, since the shared memory 108 has a plurality of write memory blocks 502 and a plurality of read memory blocks 504, the BIOS unit 106 may search for the empty write memory block 502 and directly issue new command data without waiting for the control unit 110 to complete the processing of the command data CMD1, thereby enhancing performance of the entire BIOS.

In addition, after the control unit 110 stores the returned data into the read memory block 504, the control unit 110 may also directly issue the interrupt signal INT1 to the BIOS unit 106 for notifying the BIOS unit 106 to read the returned data RS1, but the present invention is not limited thereto.

In summary, in the present invention, the shared memory (whose operating clock is approximately 667/800 MHz) is used to store the command data and the returned data so as to resolve a problem of a difference in data processing speed between the CPU (whose operating clock is above 1 GHz) and the control unit (e.g., an embedded controller, whose operating clock is approximately 20 MHz). Thus, the BIOS unit can issue new commands to the control unit without waiting for the control unit of a slower data processing speed to complete old commands, thereby enhancing performance of the entire BIOS. In addition, high speed and continuous access and transfer of large block data can be achieved by using the shared memory as a communication medium of the BIOS unit and the control unit, and it is more efficient than the method of transferring data (operating clock is 8.33 MHz) by using a word length of 8 bits in the conventional architecture.

Embodiments of the present invention also have following effects: firstly, a situation of being interrupted by other interrupts, and further being discontinuous in executing commands performed by the control unit and increase in a probability of command execution errors of the control unit when the control unit performs commands can be avoided by using a transfer data format configured by the control unit and the BIOS unit. Secondly, access programming code of the shared memory is more concise and more easily understood than the conventional input/output methods, and writing errors do not occur easily. Thirdly, a communication data format can be specified in the shared memory to achieve a functionality of a command queue, the BIOS unit can issue new commands to the shared memory when the control unit has not completed old commands, and the controller unit then sequentially completes the issued commands by the BIOS unit. Fourthly, after the control unit stores the returned data into the shared memory, the control unit further produces a system interrupt signal to the BIOS for notifying the BIOS unit to read the returned data. Accordingly, it is more efficient than a communication method of the conventional architecture.

Although the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A data processing apparatus of a basic input/output system, comprising:
   a basic input/output system unit, for issuing command data, wherein the command data includes identification data and a command name;
   a shared memory, coupled to the basic input/output system unit, wherein the basic input/output system unit writes the command data into the shared memory, and the identification data in the command data is stored in an identification field; and
   a control unit, coupled to the shared memory, for reading and performing the command data according to the identification data in the identification field, and writing returned data into the shared memory for the basic input/output system unit to read the returned data, wherein the returned data is the executed result of the command data performed by the control unit, and the returned data includes the identification data.

2. The data processing apparatus of a basic input/output system as claimed in claim 1, wherein the control unit reads and performs the command data when the identification data represents a non-zero value.

3. The data processing apparatus of a basic input/output system as claimed in claim 1, wherein the command data further includes to-be-processed data.

4. The data processing apparatus of a basic input/output system as claimed in claim 3, wherein the returned data further includes processing status data and processed data, wherein the process status data indicates the executed result of the command data performed by the control unit.

5. The data processing apparatus of a basic input/output system as claimed in claim 1, wherein the shared memory includes a write memory block and a read memory block, wherein the basic input/output system stores the command data into the write memory block, and the control unit stores the returned data into the read memory block.

6. The data processing apparatus of a basic input/output system as claimed in claim 5, wherein the control unit clears the command data in the read memory block after the control unit reads the command data.

7. The data processing apparatus of a basic input/output system as claimed in claim 5, wherein the basic input/output system unit clears the returned data in the read memory block after the control unit reads the returned data.

8. The data processing apparatus of a basic input/output system as claimed in claim 4, wherein the control unit issues an interrupt signal so as to notify the basic input/output system unit to read the returned data.

9. The data processing apparatus of a basic input/output system as claimed in claim 1, wherein the shared memory comprises a read/write memory block, wherein the read/write memory block is used to store the command data and the returned data.

10. The data processing apparatus of a basic input/output system as claimed in claim 9, wherein the command data further includes read/write status data and to-be-processed data, wherein the read/write status data is stored in a read/write status field for indicating an access status of the read/write memory block.

11. The data processing apparatus of a basic input/output system as claimed in claim 10, wherein the access status of the read/write memory block includes a read/write status, a write status and a busy status, wherein the access status of the read/write memory block is the write status after the basic input/output system unit writes the command data, the access status of the read/write memory block is the busy status after the control unit reads the command data, and the access status of the read/write memory block is the read status after the control unit writes the returned data.

12. The data processing apparatus of a basic input/output system as claimed in claim 11, wherein the returned data further comprises the read/write status data, processing status data and processed data, wherein the processing status data indicates the executed result of the command data performed by the control unit.

13. The data processing apparatus of a basic input/output system as claimed in claim 1, wherein the control unit is an embedded controller.

* * * * *